(12) United States Patent
Raszkowski et al.

(10) Patent No.: US 7,586,225 B2
(45) Date of Patent: Sep. 8, 2009

(54) HYBRID TRANSMISSION MOTOR MODULE WITH INTEGRAL WIRE CONNECTIONS

(75) Inventors: James A. Raszkowski, Indianapolis, IN (US); Edward L. Kaiser, Rochester Hills, MI (US); Anthony P. Tata, Fenton, MI (US); Kyle K. Kinsey, Fenton, MI (US); Joel E. Mowatt, Zionsville, IN (US); William S. Reed, Greenfield, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 291 days.

(21) Appl. No.: 11/060,227

(22) Filed: Feb. 17, 2005

(65) Prior Publication Data

US 2005/0206349 A1 Sep. 22, 2005

Related U.S. Application Data

(60) Provisional application No. 60/555,270, filed on Mar. 22, 2004.

(51) Int. Cl.
*H02K 5/00* (2006.01)
*B60K 1/00* (2006.01)

(52) U.S. Cl. .............. 310/71; 310/68 B; 310/68 C; 310/89; 475/5; 180/65.21; 180/65.25; 180/65.8

(58) Field of Classification Search .............. 310/89, 310/71, 68 B, 68 C; 290/40 C, 46; 475/5; 180/65.2, 65.8, 65.7
See application file for complete search history.

(56) References Cited

U.S. PATENT DOCUMENTS

| | | | | |
|---|---|---|---|---|
| 6,340,339 | B1 * | 1/2002 | Tabata et al. | 475/5 |
| 6,373,155 | B1 * | 4/2002 | Shimizu et al. | 310/68 B |
| 6,470,984 | B1 * | 10/2002 | Nakajima et al. | 180/65.2 |
| 6,492,742 | B1 * | 12/2002 | Fujikawa et al. | 290/40 C |
| 6,531,795 | B2 * | 3/2003 | Weimer | 310/53 |
| 6,664,678 | B2 * | 12/2003 | Shimizu | 310/71 |
| 7,002,271 | B2 * | 2/2006 | Reed et al. | 310/71 |
| 7,129,595 | B2 * | 10/2006 | Reed et al. | 290/46 |
| 2001/0013731 | A1 * | 8/2001 | Shinohara et al. | 310/85 |
| 2002/0043883 | A1 * | 4/2002 | Shimizu | 310/71 |
| 2005/0206349 | A1 * | 9/2005 | Raszkowski et al. | 322/15 |

* cited by examiner

*Primary Examiner*—Karl I Tamai

(57) ABSTRACT

A hybrid transmission includes two electric motor modules and a plurality of planetary gear sets operatively connectable to the motor modules and to an engine. The motor modules each include integral wire connections such that as the motor modules are physically inserted into the hybrid transmission during assembly, the electrical connections may be easily established.

10 Claims, 5 Drawing Sheets

HYBRID TRANSMISSION MOTOR MODULE WITH INTEGRAL WIRE CONNECTIONS

CROSS REFERENCE TO RELATED APPLICATIONS

This application claims the benefit of U.S. Provisional Application No. 60/555,270, filed Mar. 22, 2004, which is hereby incorporated by reference in its entirety.

TECHNICAL FIELD

This invention relates to an improved motor module adapted for use in a hybrid electro-mechanical transmission.

BACKGROUND OF THE INVENTION

Electric motors implemented in hybrid electro-mechanical transmissions are typically electrically connected thereto by a plurality of wires. Accordingly, assembling the electric motors within a hybrid transmission generally requires the steps of assembling the electric motors within the transmission and thereafter connecting a plurality of wires between the motors and the transmission.

SUMMARY OF THE INVENTION

The present invention is drawn to an improved motor module, adapted for use in a hybrid electro-mechanical transmission, that includes integral wire connections to facilitate the assembly process.

A hybrid transmission including two electric motor modules and a plurality of planetary gear sets operatively connectable to the motor modules and to an engine is provided. The motor modules each include integral wire connections such that as the motor modules are physically inserted into the hybrid transmission during assembly, the electrical connections may be easily established. The motor modules may also be adapted to include integral sensors and sensor connections for measuring motor speed, motor position and temperature.

The motor module of the present invention includes a module housing having a motor assembly disposed therein. The motor assembly includes a stator having stator windings and a rotor circumscribed by the stator. An electrical connector assembly in communication with the stator windings is attached to the module housing. The electric connector assembly is pre-aligned relative to the hybrid transmission such that establishing an electrical connection between the motor module and the hybrid transmission is simplified.

According to a preferred embodiment, the module housing includes an access port to which the electric connector is attached. One or more power terminals extending from the stator windings are mounted to said electric connector assembly.

According to another preferred embodiment, one or more sensors are disposed within the module housing. The sensors may include, for example, a speed sensor, a position sensor and/or a thermal sensor.

According to yet another preferred embodiment, the motor module includes a housing cover mounted to the module housing to enclose the motor assembly. The module housing preferably includes a plurality of mounting tabs for attaching the motor module to the transmission. At least one of the plurality of mounting tabs may include an alignment hole to ensure the motor module is properly mounted to the hybrid transmission.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
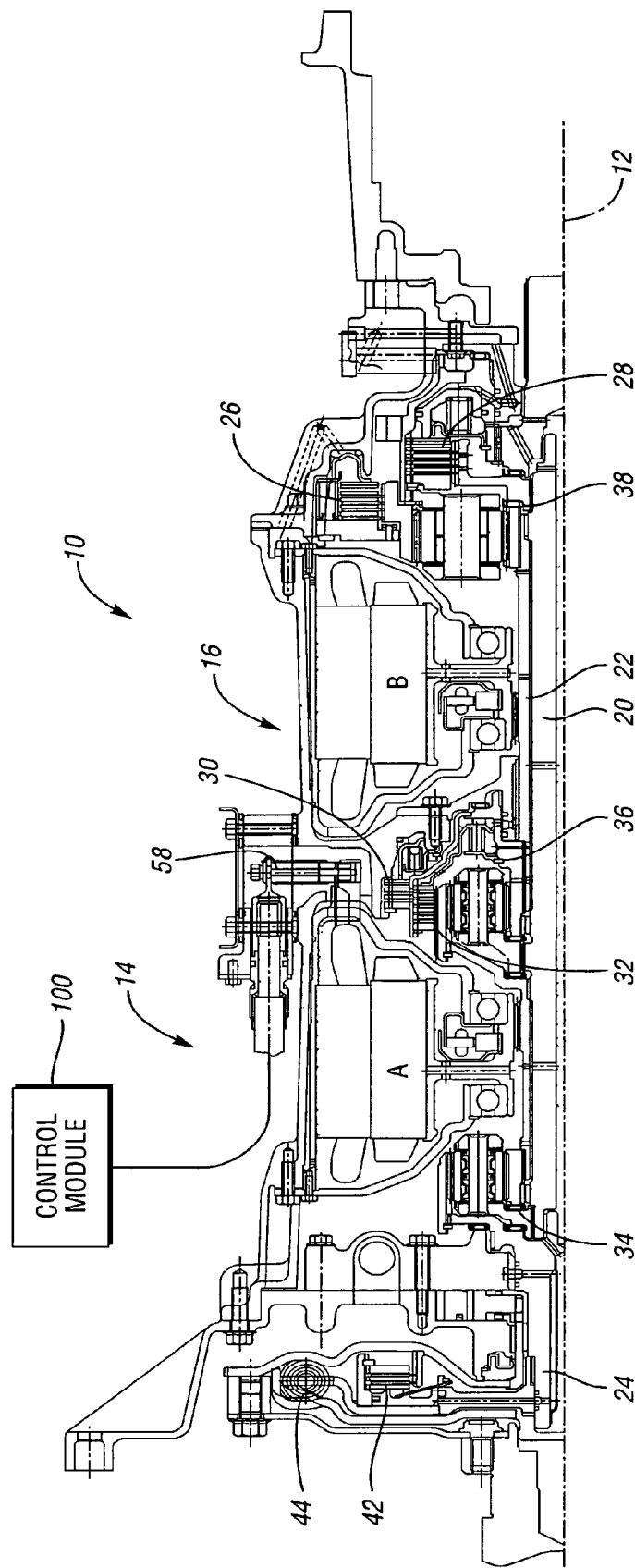
FIG. 1 is a schematic fragmentary cross-sectional view of a hybrid electro-mechanical transmission in accordance with the invention.

Referring to the drawings, wherein like reference numbers refer to like components, FIG. 1 shows the upper half of a transmission 10, in cross sectional view. The lower half of the transmission (not shown) is disposed on the opposite side of center axis 12. First and second electric motor modules 14, 16, respectively, are disposed about the center axis 12 within the transmission 10. A control module 100 is adapted to control the electric motor modules 14, 16. The sectional view of FIG. 1 only shows the control module 100 connected to the motor module 14; however, it should be appreciated that there is a similar connection for the motor module 16. A main shaft 20 is longitudinally disposed, rotatable about the center axis 12. A plurality of inner shafts, such as inner shaft 22, are concentrically disposed about the main shaft 20, and are likewise rotatable about the center axis. An input shaft 24 is disposed forward of the main shaft 20 and is operable for transferring power from an engine (not shown) to the transmission 10. Engagement of one or more of a plurality of clutches included in the transmission 10 (first, second, third and fourth clutches, 26, 28, 30 and 32 respectively, being shown) interconnects one or more of first, second and third planetary gear sets 34, 36, and 38, respectively, to transfer power at varying ratios to an output member (not shown). As will be readily understood by those skilled in the art, each of the planetary gear sets includes a sun gear member, a planet carrier assembly member and a ring gear member. A fifth clutch, referred to as a lockout clutch 42, is operable for locking out torsion isolator 44 from surrounding structural elements, and to provide a direct connection between the engine and transmission.

Figure 2:
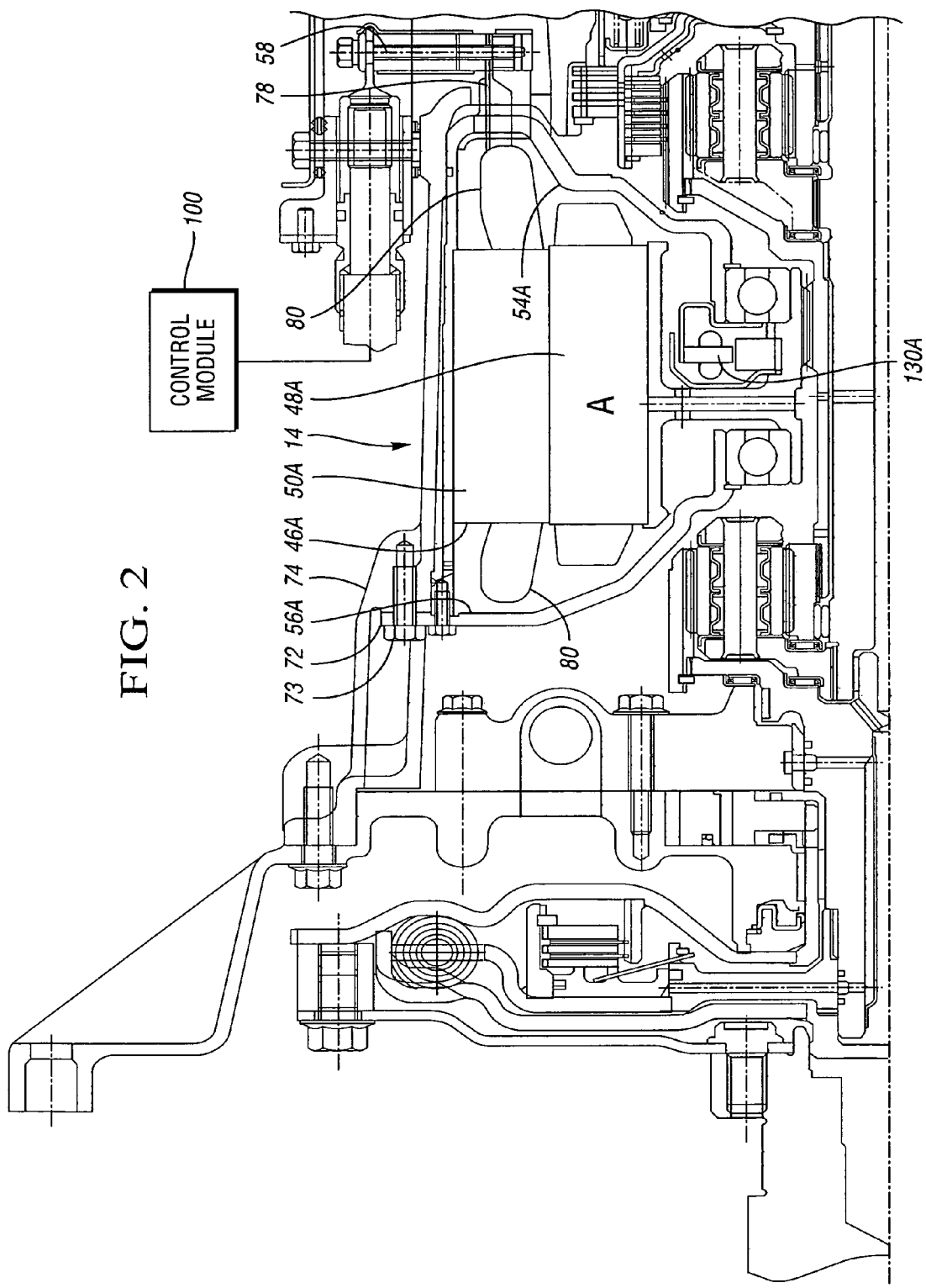
FIG. 2 is a schematic fragmentary cross-sectional view of a frontward portion of the transmission of FIG. 1.
Figure 3:
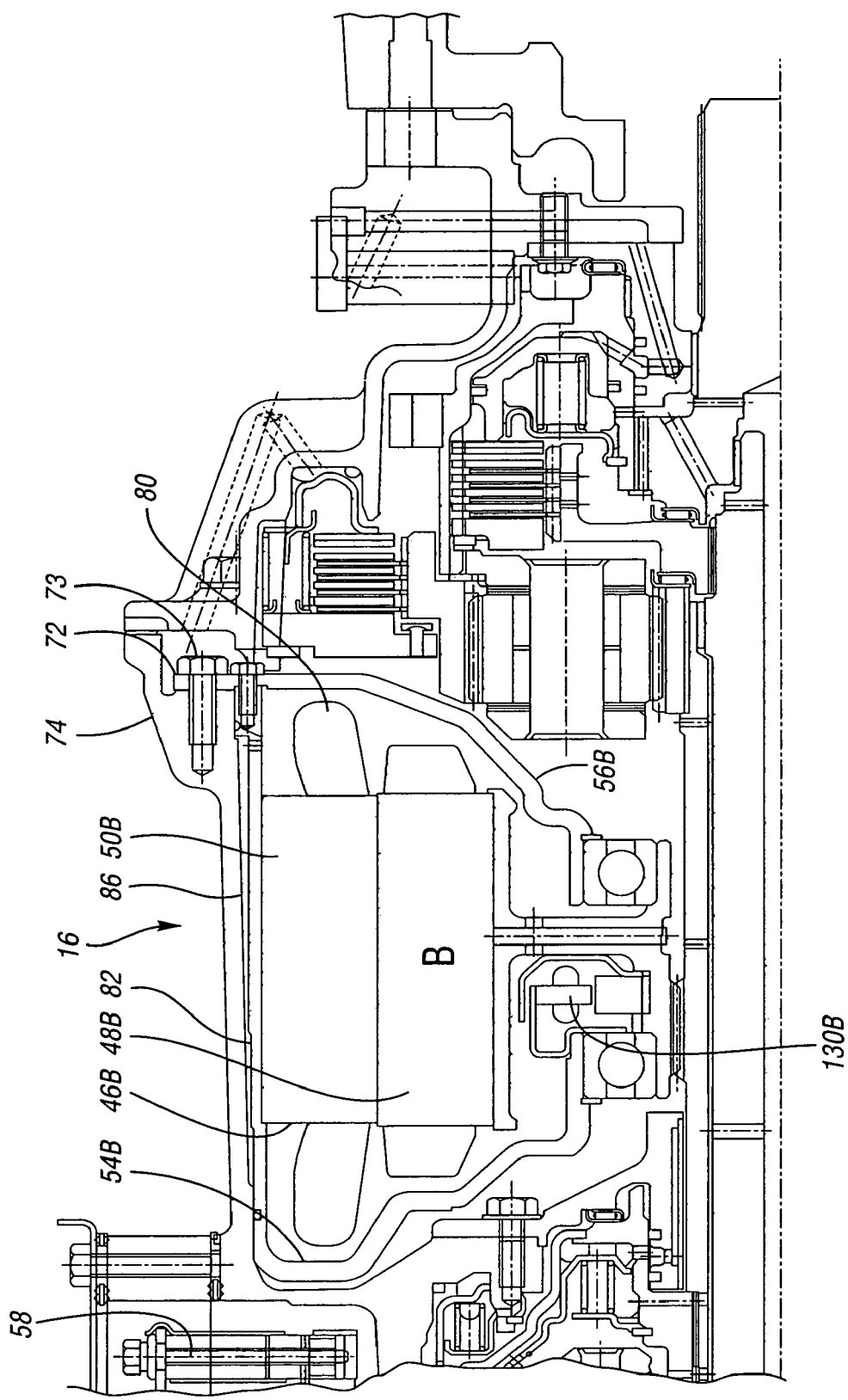
FIG. 3 is a schematic fragmentary cross-sectional view of a rearward portion of the transmission of FIG. 1.

Referring to FIGS. 2 and 3, the first and second motor modules 14, 16, respectively, are each self-contained assemblies. Each contains a motor 46A, 46B. The motors 46A, 46B are preferably three-phase electric motors; however, other motor configurations may be envisioned. The motors 46A, 46B, each include a rotor 48A, 48B and a stator 50A, 50B, respectively. An electrical connector 78 (shown in FIG. 4), motor position and speed sensors 130A, 130B, and a drum composed of a generally cylindrical module housing 54A, 54B and a module housing cover 56A, 56B are included in the modules. According to a preferred embodiment, the housing 54A, 54B is composed of formed steel and the cover 56A, 56B is stamped steel; however, it should be appreciated that the housing and cover may be composed of alternate materials and/or fabricated according to other known manufacturing processes.

The housing covers 56A, 56B preferably include external mounting tabs 72 radially spaced about the cover that allow the motor modules 14, 16 to be bolted to the transmission housing 74 by bolts 73. The tabs 72 provide easily accessible attachment and assist in aligning the motor modules 14, 16 during assembly to the transmission housing 74. At least one of the mounting tabs 72 preferably includes an alignment hole 70 (shown in FIG. 4) to ensure proper alignment during the installation of the motor modules 14, 16 to the transmission housing 74.

Figure 4A:
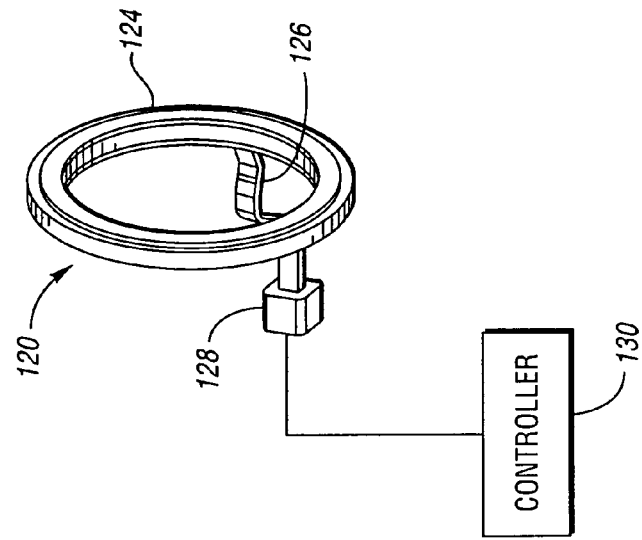
FIG. 4A is a schematic perspective view of a thermal sensor used in the transmission of FIG. 1.
Figure 4:
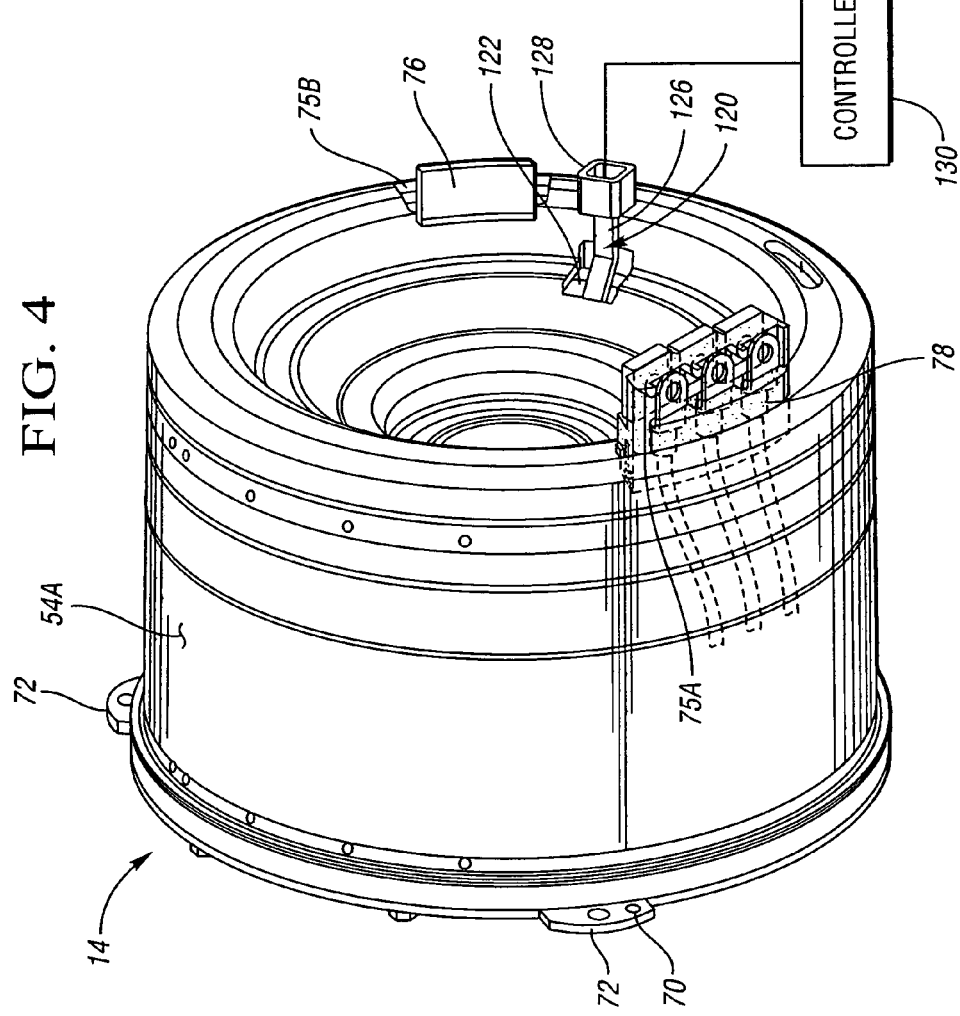
FIG. 4 is a schematic perspective view of a housing and attached cover for a motor module used in the transmission of FIG. 1.

Referring to FIG. 4, the housing 54A defines access ports 75A, 75B with lanced tabs 76 formed at a peripheral edge thereof. An electrical connector 78 may be integrated into the motor module 14 by attachment at one of the access ports (shown here attached at access port 75A). The electric connector 78 is fixed to the module housing 54A at a predetermined location in order to simplify the establishment of an electrical connection between the motor module 14 and the control module 100. More precisely, the access ports 75A, 75B are preferably located at a predetermined location on the housing 54A such that an electrical connector 78 mounted in one of the access ports 75A, 75B will be aligned in a manner adapted to facilitate the formation of an electrical connection between the stator windings 80 (shown in FIGS. 2 and 3) of the motor 46A and the control module 100 (shown in FIGS. 1 and 2).

Figure 5:
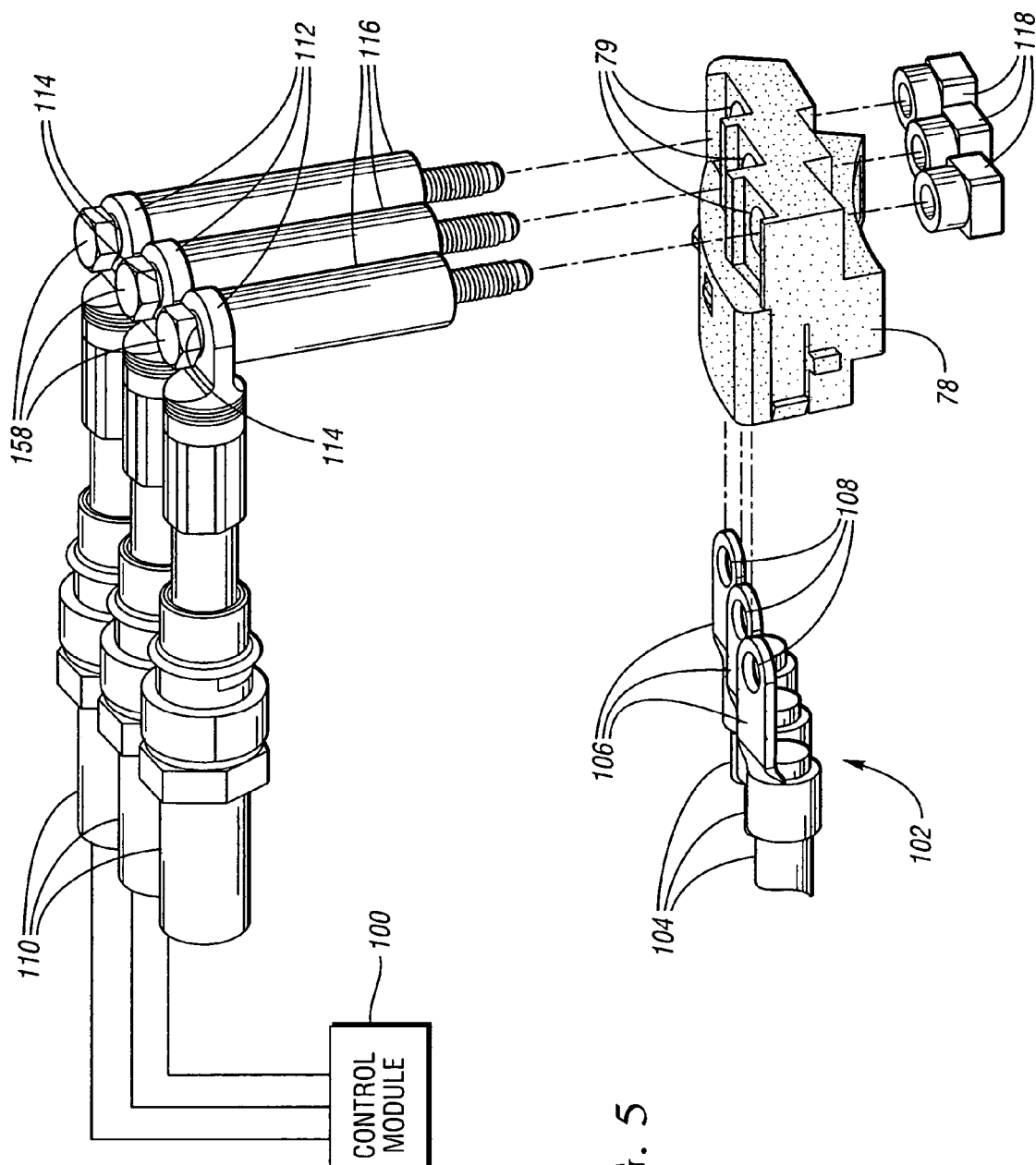
FIG. 5 is a schematic perspective view showing the electrical connections between an electric motor of the transmission of FIG. 1 and a control module.

Referring to FIGS. 4 and 5, the motor 46A is driven by the power terminals 102. The preferred embodiment depicted in the figures shows a three terminal motor; however, it should be appreciated that alternate motor configurations may be implemented. The power terminals 102 each preferably include a stator lead 104 having an end portion with a conductor 106 defining an attachment hole 108. According to an alternate embodiment, the power terminals 102 may be composed of stator conductor wire formed to create an integral terminal (not shown) such that a separate conductor 106 defining an attachment hole 108 is not necessary. The power terminals 102 extend from the stator windings 80 (shown in FIGS. 2 and 3) within the housing 54A and through one of the access ports 75A, 75B such that the conductors 106 are inserted into the electrical connector 78. The electrical connector 78 defines an attachment hole or feature 79 for each power terminal. Each power terminal 102 is inserted into the electrical connector 78 such that the conductor portion 106 remains exposed and the attachment holes 79, 108 of the electrical connector 78 and conductor 106 align.

Referring to FIG. 5, the control module 100 is connected to a plurality of control module wires 110. The control module wires 110 extend from the control module and terminate at an opposite end portion with a conductor 112 defining an attachment hole 114. After the motor module 14 (shown in FIGS. 1 and 2) is assembled into the transmission, the electrical connection between the motor 46A (shown in FIGS. 1 and 2) and the control module 110 is formed as follows. A generally cylindrical and hollow conductor sleeve 116 is provided for each control module wire 110. A first end portion of the conductor sleeve 116 is adapted to engage the conductor 106 and an opposite end portion engages the conductor 112 such that the hollow portion of the conductor sleeve is aligned with the attachment holes 108, 114 of the conductors 106, 112. A threaded fastener 58 is disposed through the attachment hole 114 of the conductor 112, through the conductor sleeve 116, through the attachment hole 108 of the conductor 106 and through the attachment hole 79 of the electrical connector 78. A nut 118, which is preferably molded into the electrical connector 78, engages an end portion of each threaded fastener 58 to maintain the electrical connection.

Referring again to FIG. 4, a thermal sensor assembly 120 is preferably mounted to the module housing through an access port 122. The thermal sensor assembly 122, which is shown in more detail in FIG. 4A, preferably includes a thermal sensor 124 disposed within the housing 54A, an enclosed wire harness 126, and a connector 128 extending out of the housing 54A. According to an alternate embodiment, the position and speed sensor 130 is electrically connected to the wire harness 126 such that the position and speed of the motor may be transmitted to a controller 130 through the connector 128. The thermal sensor 124 is adapted to provide the controller 130 data pertaining to the temperature of the motor 46A. According to a preferred embodiment, the thermal sensor 124 is a thermistor; however, it should be appreciated that alternate thermal sensors may be implemented. The connector 128 is fixed to the module housing 54A at a predetermined location to facilitate the formation of an electrical connection to the controller 130.

Accordingly, the motor module 14 may be shipped and assembled into the transmission 10 with connectors 78 and 128 being fixed at predefined locations to conveniently form electrical connections at two discrete locations thereby reducing the assembly time previously required to connect a plurality of individual wires. Additionally, there are no external wires protruding from the motor module which minimizes the potential for wire damage during installation of the module 14. The motor module 16 includes the features described hereinabove with respect to the motor module 14.

While the best modes for carrying out the invention have been described in detail, those familiar with the art to which this invention relates will recognize various alternative designs and embodiments for practicing the invention within the scope of the appended claims.

The invention claimed is:

1. A motor module for a hybrid transmission comprising:
   a generally cylindrical module housing having an open end and an enclosed end opposite the open end;
   a module housing cover mounted to the open end of the module housing;
   a motor disposed within said module housing, said motor including:
      a stator having stator windings; and
      a rotor circumscribed by the stator;
   said module housing and said motor forming a subassembly which is physically insertable into said hybrid transmission;
   said subassembly defining an access port at said enclosed end;
   an electric connector assembly attached to the subassembly at the access port and in communication with the stator windings; and
   wherein said electric connector assembly has an attachment feature which is fixed to the subassembly at a predetermined location prealigned relative to said hybrid transmission in order to simplify the establishment of an electrical connection between the motor module and a control module when said subassembly is physically inserted.

2. The motor module of claim 1 further comprising one or more power terminals mounted to said electric connector assembly.

3. The motor module of claim 1 further comprising a speed sensor disposed within said subassembly.

4. The motor module of claim 1 further comprising a position sensor disposed within said subassembly.

5. The motor module of claim 1 further comprising a thermal sensor mounted to the subassembly.

6. The motor module of claim 1 wherein the module housing includes a plurality of mounting tabs for attaching the subassembly to the transmission.

7. The motor module of claim 6 wherein at least one of said plurality of mounting tabs includes an alignment hole.

8. A motor module for a hybrid transmission, said motor module comprising:
   a generally cylindrical module housing having an open end and an enclosed end opposite the open end, said module housing defining an access port at said enclosed end;
   a motor disposed within said module housing, said motor including:
     a stator having stator windings; and
     a rotor circumscribed by the stator;
   said module housing and said motor forming a subassembly which is physically insertable into said hybrid transmission;
   said module housing including a plurality of mounting tabs at least one of which is alignable with said hybrid transmission when said subassembly is physically inserted in said hybrid transmission;
   an electric connector assembly attached to the subassembly at the access port and in communication with the stator windings;
   a first sensor disposed within the subassembly, said first sensor being adapted to measure the position and speed of the motor;
   a second sensor disposed within the subassembly, said second sensor being adapted to measure the temperature of the motor; and
   a module housing cover mounted to the open end of the module housing and including said at least one of said mounting tabs;
   wherein said electric connector assembly has an attachment feature which is fixed to the subassembly at a predetermined location pre-aligned relative to said hybrid transmission in order to simplify the establishment of an electrical connection between the motor module and a control module.

9. The motor module of claim 8 wherein at least one of said plurality of mounting tabs includes an alignment hole.

10. The motor module of claim 8 further comprising one or more power terminals mounted to said electric connector assembly.

* * * * *